(No Model.)

H. BROERS.
BICYCLE WHEEL.

No. 552,984.  Patented Jan. 14, 1896.

Witnesses:
L. C. Hills.
E. H. Bond

Inventor:
Henry Broers,
by E. B. Stocking
Atty.

UNITED STATES PATENT OFFICE.

HENRY BROERS, OF GALVESTON, TEXAS.

BICYCLE-WHEEL.

SPECIFICATION forming part of Letters Patent No. 552,984, dated January 14, 1896.

Application filed May 14, 1895. Serial No. 549,261. (No model.)

*To all whom it may concern:*

Be it known that I, HENRY BROERS, a citizen of the United States, residing at Galveston, in the county of Galveston, State of Texas, have invented certain new and useful Improvements in Bicycles, of which the following is a specification, reference being had therein to the accompanying drawings.

This invention relates to certain new and useful improvements in bicycles, and more particularly to the construction and arrangement of the rear wheel, which latter is in the form of a double wheel—that is, a wheel with a single hub or axle and two rims, two sets of spokes and tires—the object being to provide a bicycle embodying a greater degree of safety and constituting, as it were, a bicycle having all the advantages of a tricycle in that the wheel will stand by itself, being designed more especially for a lady's machine. The rear or double wheel is composed, as above stated, of two rims and the spokes of the one rim leading inclinedly to the hub of the other wheel, and vice versa, and each rim is provided, further, with a set of spokes extending substantially straight—that is, from the rim to the hub of the wheel of which said rim constitutes a part. I thus provide a very strong construction of wheel which may be made very light and much cheaper than two single wheels.

Other objects and advantages of the invention will hereinafter appear and the novel features thereof will be particularly pointed out in the appended claim.

The invention is clearly illustrated in the accompanying drawings, which, with the letters of reference marked thereon, form a part of this specification, and in which—

Figure 1:
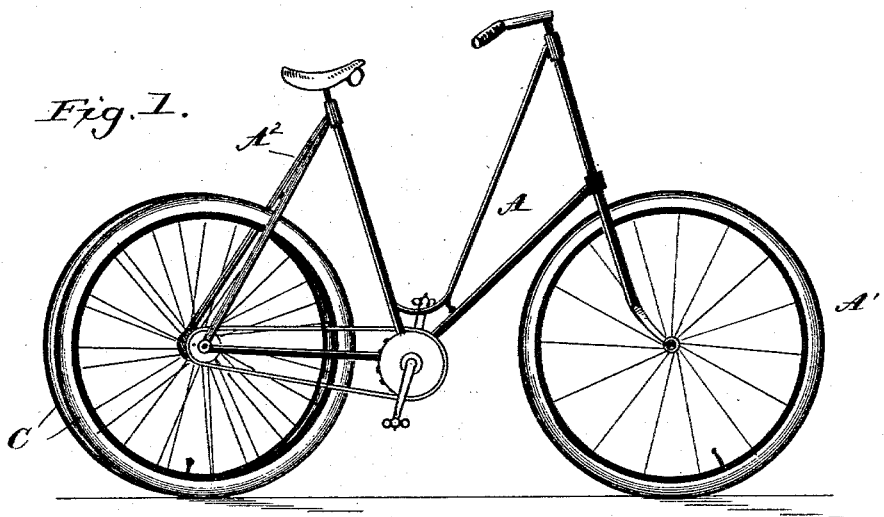
Figure 2:
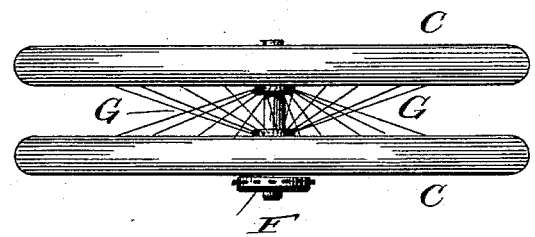
Figure 3:
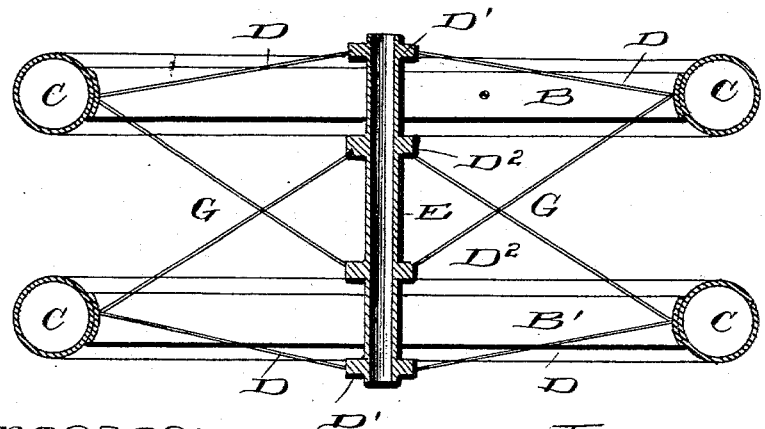

Figure 1 is a side elevation of a bicycle constructed in accordance with my invention. Fig. 2 is a plan view of the rear double wheel, and Fig. 3 is an enlarged central section through the same.

Like letters of reference indicate like parts throughout the several views.

Referring now to the details of the drawings by letter, A designates the frame and A' the front wheel of a bicycle, these parts being of any well-known or approved form of construction, and the bicycle has a wheel adapted to be propelled by any preferred form of mechanism.

The gist of the invention resides in the construction of the hind wheel and a bicycle thus equipped. The hind wheel consists of two rims B B', of wood or metal, as may be preferred, and provided with tires C of any suitable nature, in this instance being shown as pneumatic. These two rims are of light nature and of corresponding diameter, and each rim is provided with two sets of spokes. The spokes D are practically straight spokes leading from the center of the rim to the collars D' of the hub or axle E, which extends from side to side and upon one end carries a sprocket-wheel F or analogous device, forming a part of the propelling mechanism.

G are spokes which extend inclinedly from the center of one rim to the flanges or collars $D^2$ of the hub or axle nearly in line with the rims, these spokes being so arranged that the spokes from the one rim cross those of the other rim between their ends, as seen in Figs. 2 and 3, thus constituting a very strong construction of wheel and one which may be made of sufficient strength and durability if composed of very light material. The rear fork $A^2$ of the frame is bifurcated, as seen in Fig. 1, and the two rims or double rear wheel are arranged between the bifurcations of said fork, as is also shown in said Fig. 1.

What I claim as new is—

As an improved article of manufacture, a bicycle wheel consisting of a hollow axle having a collar at each end, collars separated from and arranged between the end collars, two independent rims, spokes extending from the center of each rim to and secured in the end collar of the axle opposite and substantially in line with said rim, and independent spokes secured to each rim and extending in inclined directions from said rim to and secured to the intermediate collars farthest from said rims, the said spokes being crossed between the rims whereby a truss brace is formed between the two independent rims, substantially as specified.

In testimony whereof I affix my signature in presence of two witnesses.

HENRY BROERS.

Witnesses:
HENRY HARRIS,
G. I. ARNOLD.